(12) United States Patent
Chen

(10) Patent No.: US 8,262,095 B2
(45) Date of Patent: Sep. 11, 2012

(54) CHUCK

(75) Inventor: Peter Chen, Taoyuan County (TW)

(73) Assignee: X'Pole Precision Tools Inc., Taoyuan County (TW)

( * ) Notice: Subject to any disclaimer, the term of this patent is extended or adjusted under 35 U.S.C. 154(b) by 1077 days.

(21) Appl. No.: 12/183,508

(22) Filed: Jul. 31, 2008

(65) Prior Publication Data

US 2010/0025943 A1   Feb. 4, 2010

(51) Int. Cl.
  *B23B 31/173* (2006.01)
(52) U.S. Cl. ............... 279/43.4; 409/233; 408/239 R; 279/38
(58) Field of Classification Search .......... 279/38, 279/39, 40, 42, 43, 43.2, 43.4, 53, 51; 409/233, 409/234; 408/238, 239 R, 239 A, 240
  See application file for complete search history.

(56) References Cited

U.S. PATENT DOCUMENTS

| 3,549,159 | A | * | 12/1970 | Kroener | 279/53 |
| 5,118,231 | A | * | 6/1992 | Daniels | 409/232 |
| 5,716,173 | A | * | 2/1998 | Matsumoto | 408/239 A |
| 5,806,859 | A | * | 9/1998 | Saccomanno, III | 279/143 |
| 6,860,889 | B2 | * | 3/2005 | Bonati et al. | 606/104 |
| 7,178,811 | B2 | * | 2/2007 | Chen | 279/52 |
| 7,290,968 | B1 | * | 11/2007 | Wu | 409/233 |
| 2004/0261241 | A1 | * | 12/2004 | Crouch | 29/428 |
| 2006/0252618 | A1 | * | 11/2006 | Imahata | 483/30 |

FOREIGN PATENT DOCUMENTS

| JP | 2008030138 A | * | 2/2008 |
| TW | M253434 | | 12/2004 |

* cited by examiner

*Primary Examiner* — Daniel Howell
*Assistant Examiner* — Paul M Janeski
(74) *Attorney, Agent, or Firm* — Muncy, Geissler, Olds & Lowe, PLLC

(57) ABSTRACT

An improved shuck has one end coupling with a fabrication machine through a holding member. The chuck includes a coupling structure, a grip means and a shank. The coupling structure has a first screwing portion at one end and a fastening member at the other end. The grip means has a second screwing portion at one end engageable with the first screwing portion and a plurality of grip jaws at the other end inclined outwards. The coupling structure and the grip means are held in a through hole formed in the shank. The through hole has an internal side to form compact holding of the grip means to firmly hold a tool. After the coupling structure is anchored through the fastening member, the shank can be turned to drive the grip means to move, and the grip jaws can be expanded or contracted to release or grip the tool.

7 Claims, 4 Drawing Sheets

CHUCK

FIELD OF THE INVENTION

The present invention relates to an improved chuck for holding a fabrication tool.

BACKGROUND OF THE INVENTION

To meet rapid progress of industrial development machining techniques also advance constantly to produce finer finished or semi-finished products. The fabrication precision of machinery depends on many factors, such as precision of tools, operation precision of the machinery, fabrication environment, and coupling and holding steadiness of the machinery and tools. One set of machine usually can hold different types of tools alternately to achieve different fabrication results (such as by changing the tools of varying sizes). After each tool changing, a calibration procedure has to be performed (because movements occur during tool changing). This involves a tedious process. Both the chuck and tool have to be removed from the machine and installed again. Fabrication tolerances and errors are bound to happen. To remedy this problem, many techniques have been proposed in prior art. For instance, R.O.C. patent No. M253434 entitled "Detachable chuck" discloses a structure mainly including a cutter stem with an axial conical cavity extended inwards from one end in a tapered manner, a holding member with a conical portion at one end and a coupling portion at the other end and a fastening member coupled on the holding member from outside and screwed on the cutter stem. The conical portion has an inclined peripheral surface formed at an angle the same as that of the conical cavity of the cutter stem, and is held in the conical cavity. The coupling portion has a central hole to hold a cutter under heating. Due to the cutter is held under heating, replacement of the cutter is troublesome. There are still rooms for improvement.

SUMMARY OF THE INVENTION

In view of the aforesaid problems occurred to the conventional techniques of changing tools that requires a tedious procedure and multiple calibrations to reduce errors, the primary object of the present invention is to provide a structure to make tool changing of fabrication machines easier and reduce error.

The present invention provides an improved chuck which has one end coupling with a fabrication machine through a holding member and the other end to fasten a tool for fabrication. The chuck further includes a coupling structure, a grip means and a shank. The coupling structure has a first screwing portion at one end and at least one fastening member at the other end. The grip means has a second screwing portion at one end engageable with the first screwing portion and a plurality of spaced grip jaws at the other end to form a tool holding space. The grip means is elastic and inclined outwards. The shank has a through hole to hold the coupling structure and the grip means. The through hole has one end fastened to the holding member and an inner side forming a compact holding of the grip means so that the tool is held firmly in an opening of the through hole. The inner side of through hole that holds the grip means is formed at an internal diameter gradually expanded from the center of the through hole towards the opening thereof. The fastening member is fastened to the coupling structure through a fixture so that the shank can be turned to drive the grip means to move the first screwing portion against the second screwing portion, and the grip means can be moved in the direction of the through hole. As a result, the grip jaws can be extended or contracted to release or grip the tool. Such a structure can extend or retract the grip jaws easily. When the grip means is extended, the grip jaws are extended outwards to enlarge the tool holding space so that the tool can be removed and replaced easily without removing the coupling structure and the grip means. Tolerance and error occurred during tool replacement are smaller. The time needed to do calibration is shorter and calibration precision is higher. Thus the shortcomings occurred to the conventional techniques can be overcome.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
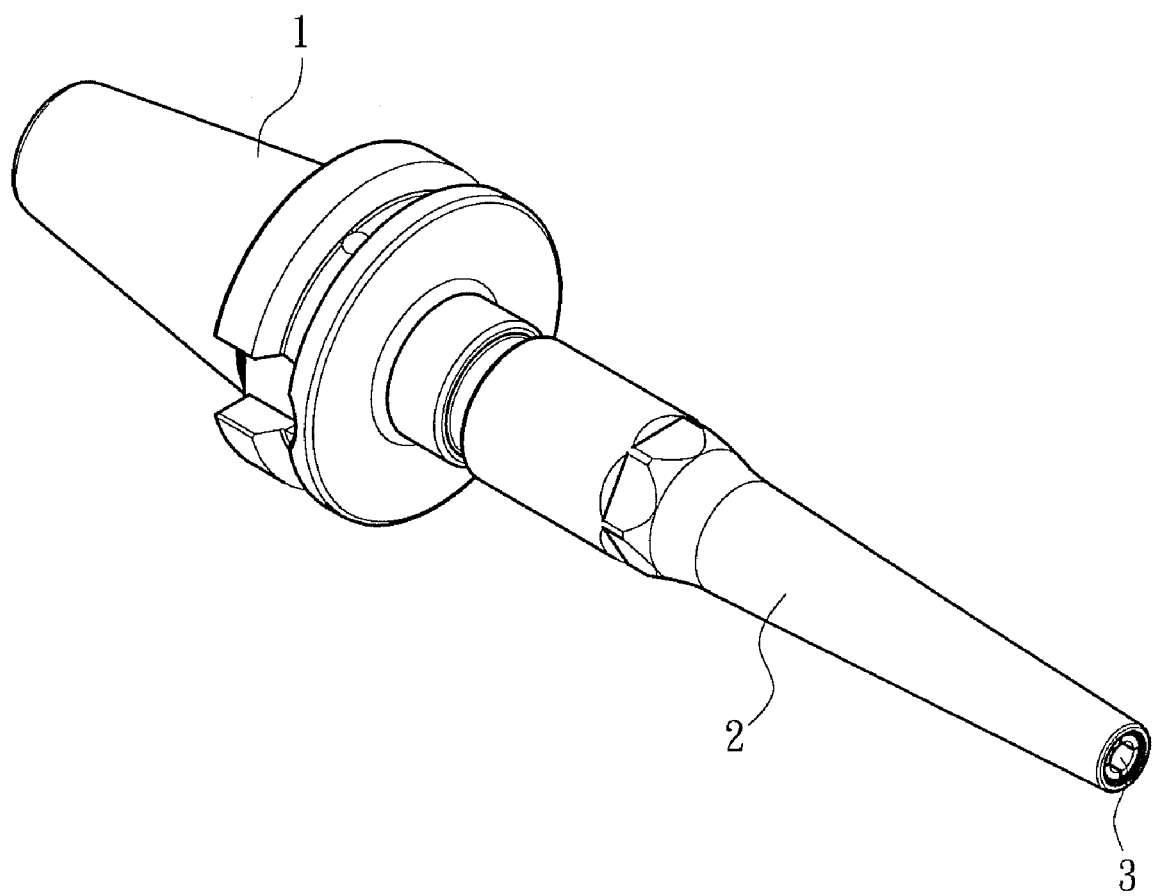
FIG. 1 is a perspective view of the invention.
Figure 2:
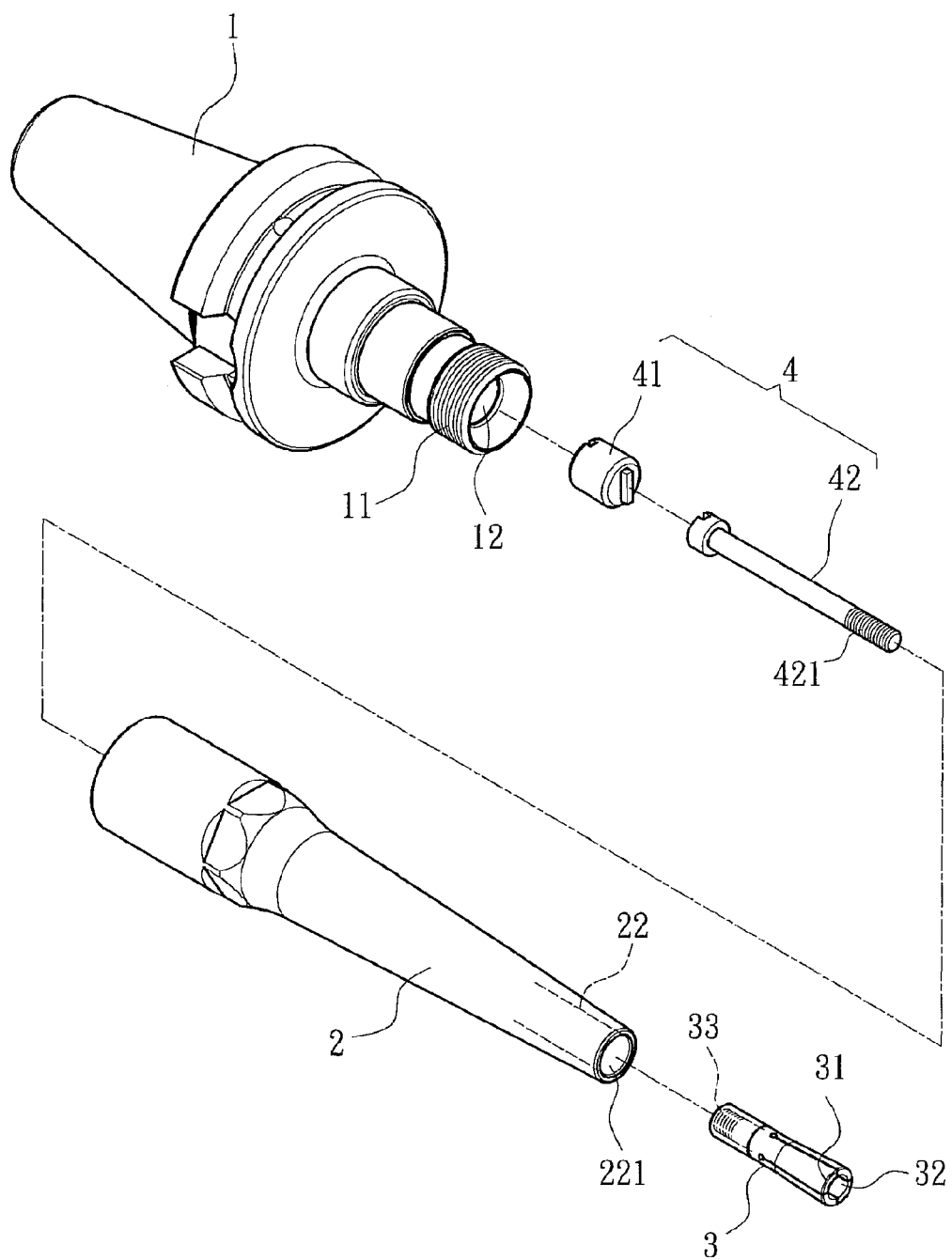
FIG. 2 is an exploded view of the invention.
Figure 3:
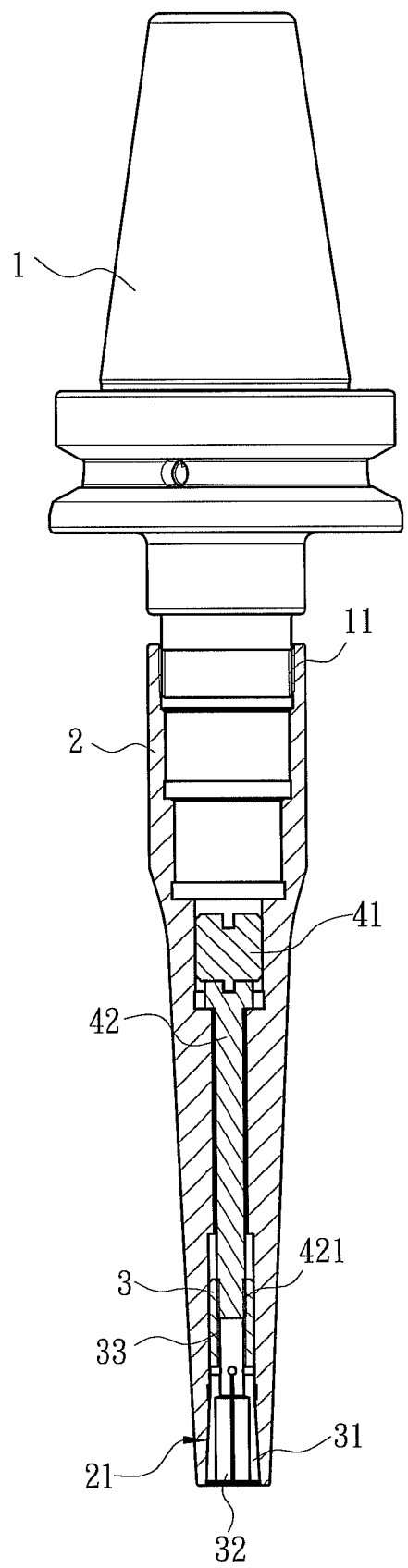
FIG. 3 is a side view of the invention partly cutaway.

Please refer to FIGS. 1, 2 and 3, a chuck according to the invention has one end coupling with a fabrication machine through a holding member 1 and the other end fastening a tool for fabrication. The chuck includes a coupling structure 4, a grip means 3 and a shank 2. The coupling structure 4 has a first screwing portion 421 at one end and at least one fastening member 41 at the other end, and at least one coupling stem 42 coupling with the fastening member 41. The first screwing portion 421 is formed at one end of the coupling stem 42. The grip means 3 has a second screwing portion 33 at one end engageable with the first screwing portion 421 that are respectively an internal thread and an external thread, and a plurality of spaced grip jaws 31 at the other end to form a tool holding space 32. The grip means 3 is elastic and inclined outwards. The shank 2 has a through hole 22 to hold the coupling structure 4 and the grip means 3. The through hole 22 has one end fastened to the holding member 1. The shank 2 and the holding member 1 are coupled by screwing, as shown in FIG. 1 with a thread portion 11 formed at one end of the holding member 1. The holding member 1 further has an opening 12 in the center to be run through by the fabrication machine for anchoring. The through hole 22 has a plurality of sections formed at different internal diameters. The coupling stem 42 (may include multiple sets coupling together) has external diameters mating the through hole 22. The through hole 22 has an internal compacting surface 21 to form a compact coupling on the grip means 3 to firmly hold a tool at an opening thereof. The compacting surface 21 may be a coarse surface to provide a sufficient friction force to grip the grip means 3. The through hole 22 for gripping the grip means 3 is formed at an internal diameter gradually enlarged from the center towards the opening.

Figure 4A:
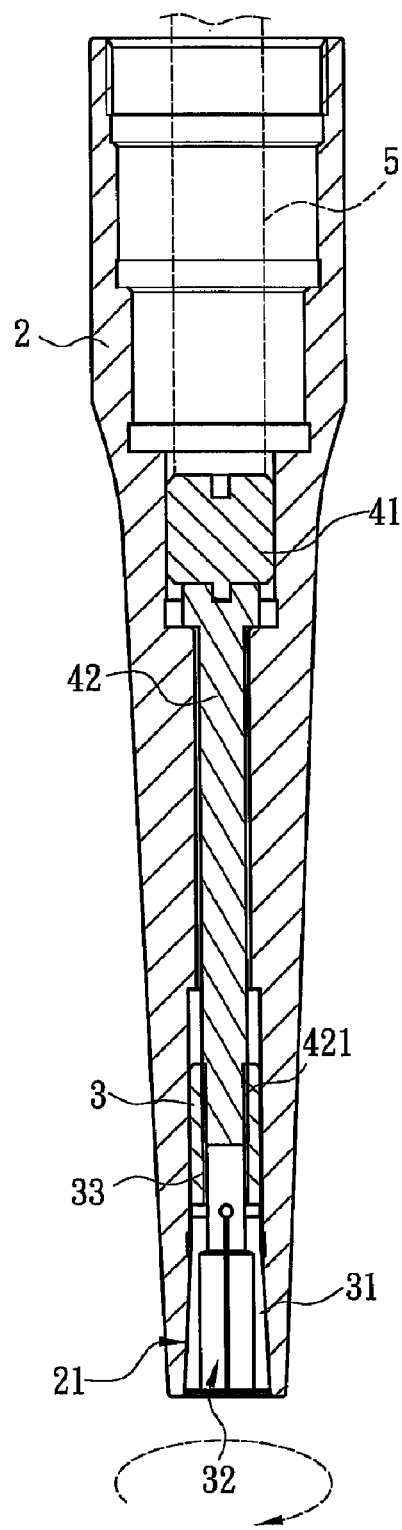
FIGS. 4A and 4B are schematic views of the invention in various use conditions.
Figure 4B:
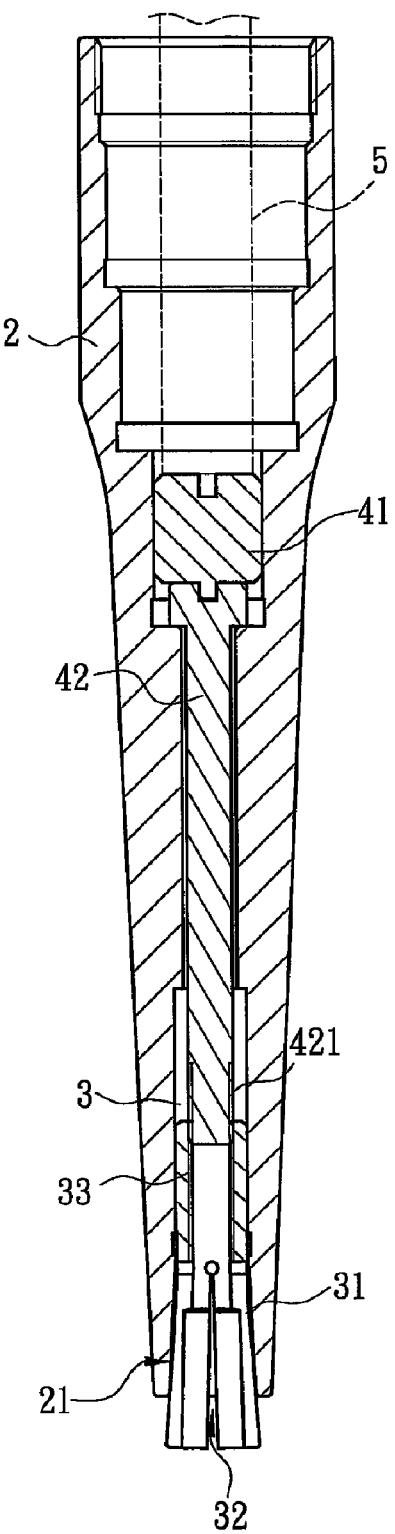

By means of the features of the chuck previously discussed, the holding member 1 can be coupled with the fabrication machine with the grip means 3 at one end to hold the tool. Refer to FIGS. 4A and 4B for the invention in use conditions. The chuck may be removed from the holding member 1, with the coupling structure 4 and the grip means 3 remain in the shank 2. By connecting the fastening member 41 to a fixture 5 the coupling structure 4 can be anchored.

Then turn the shank 2 to drive the grip means 3 through the friction force so that the first screwing portion 421 and the second screwing portion 33 are moved relative to each other. As the coupling structure 4 is anchored and remains still, the grip means 3 is moved in the direction of the through hole 22 due to the relative movement of the first and second screwing portions 421 and 33. Because the internal diameter of the through hole 22 gripping the grip means 3 gradually enlarges from the center of the through hole 22 towards the opening, when the grip means 3 is moved towards the opening, the grip jaws 31 also gradually extend outwards, thus the tool is released or the tool holding space 32 is expanded to facilitate mounting of the tool (as shown in FIGS. 4A and 4B). On the other hand, the shank 2 may be turned in the opposite direction to withdraw the grip means 3 and retract the gripped tool to be mounted onto the fabrication machine. The structure set forth above allows the grip jaws 31 to expand or contract to release or grip the tool by simply turning the shank 2. Thus the tool can be replaced without removing the holding member 1. The time that otherwise is needed for removing the holding member 1 and the calibration time can be saved, and errors that might otherwise occur can be reduced. Replacement of the tool also is simpler.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An improved chuck having one end coupling with a fabrication machine through a holding member and the other end holding a fabrication tool, comprising:
    a coupling structure which has one end forming a first screwing portion and the other end coupling with at least a fastening member;
    a grip means which has one end forming a second screwing portion engageable with the first screwing portion and the other end having a plurality of spaced grip jaws to form a tool holding space, the grip means being elastic and inclined outwards; and
    a shank which has a through hole to hold the coupling structure and the grip means, the through hole having one end fastened to the holding member and an internal side to form compact holding of the grip means to allow an opening of the through hole to firmly hold the fabrication tool, the through hole being formed at an internal diameter gradually expanded from the center thereof towards the opening;
    wherein when the fastening member is coupled with a fixture to anchor the coupling structure, the shank is turnable to drive the grip means so that the first screwing portion and the second screwing portion are moved relative to each other, and the grip means is movable in the direction of the through hole such that the grip jaws are expanded or contracted to release or grip the fabrication tool.

2. The improved chuck of claim 1, wherein the internal side of the through hole is formed a coarse compacting surface to form the compact holding of the grip means.

3. The improved chuck of claim 1, wherein the coupling structure includes at least one coupling stem coupling with the fastening member.

4. The improved chuck of claim 1, wherein the through hole has a plurality of sections formed at varying internal diameters.

5. The improved chuck of claim 4, wherein the coupling structure includes at least one coupling stem coupling with the fastening member.

6. The improved chuck of claim 5, wherein the coupling stem has an external diameter corresponding to the through hole.

7. The improved chuck of claim 1, wherein the first screwing portion and the second screwing portion are respectively an external thread and an internal thread engageable with each other.

* * * * *